United States Patent
G et al.

(10) Patent No.: US 10,791,067 B1
(45) Date of Patent: Sep. 29, 2020

(54) COGNITIVE MESSAGE RESPONSE ASSISTANT

(71) Applicant: International Business Machines Corporation, Armonk, NY (US)

(72) Inventors: Basavaraju G, Anatapur (IN); Rose N. Judge, Portland, OR (US); Janani Janakiraman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 16/291,062

(22) Filed: Mar. 4, 2019

(51) Int. Cl.
*G06F 15/16* (2006.01)
*H04L 12/58* (2006.01)

(52) U.S. Cl.
CPC .............. *H04L 51/02* (2013.01); *H04L 51/04* (2013.01)

(58) Field of Classification Search
USPC ....... 709/203, 204, 206, 217, 219, 223, 224, 709/226, 228, 230, 232, 238; 707/734
See application file for complete search history.

(56) References Cited

U.S. PATENT DOCUMENTS

| | | | |
|---|---|---|---|
| 9,755,996 B2 | 9/2017 | Basson | |
| 10,250,541 B2 * | 4/2019 | Beach | H04L 51/16 |
| 2007/0043866 A1 * | 2/2007 | Garbow | G06Q 10/107 709/226 |
| 2011/0087747 A1 * | 4/2011 | Hirst | H04L 51/28 709/206 |
| 2012/0016678 A1 | 1/2012 | Gruber | |
| 2012/0315880 A1 | 12/2012 | Peitrow | |
| 2013/0159408 A1 * | 6/2013 | Winn | G06N 20/00 709/204 |
| 2015/0271324 A1 | 9/2015 | Janakiraman | |
| 2015/0373183 A1 | 12/2015 | Woolsey | |
| 2016/0140219 A1 * | 5/2016 | Chakra | G06F 16/90324 707/734 |
| 2017/0180276 A1 | 6/2017 | Gershony | |

(Continued)

OTHER PUBLICATIONS

"Recurrent neural network", Wikipedia, this page was last edited on Dec. 3, 2018, 17 pages, <https://en.wikipedia.org/wiki/Recurrent_neural_network>.

(Continued)

*Primary Examiner* — Quang N Nguyen
(74) *Attorney, Agent, or Firm* — Edward J. Wixted, III

(57) ABSTRACT

In an approach to cognitive message response, a computer receives an electronic message from a message initiator. The computer creates a custom knowledge base associated with a recipient of the electronic message. The computer determines whether the recipient is available to respond to the received electronic message. The computer determines a status of the recipient based on the custom knowledge base and one or more types of unstructured data. The computer determines a status of the message initiator. Based on the received electronic message, the computer determines a content of the message. Based on the status of the recipient, the status of the initiator, and the content of the electronic message, the computer predicts a response of the recipient to the received electronic message. The computer creates a response to the received electronic message based on the predicted response. The computer transmits the response to the message initiator.

20 Claims, 3 Drawing Sheets

(56) References Cited

U.S. PATENT DOCUMENTS

2017/0339278 A1    11/2017  Wang
2018/0295089 A1*  10/2018  Patil .................... H04L 51/02
2018/0329982 A1*  11/2018  Patel ................ G06F 16/3322

OTHER PUBLICATIONS

IBM, "AlchemyLanguage", AlchemyLanguage |IBM Watson Developer Cloud, © 2018 IBM, 3 pages, <https://www.ibm.com/watson/developercloud/alchemy-language.html>.

IBM, "IBM Watson Assistant", Watson Assistant | IBM Cloud, printed on Dec. 5, 2018, 6 pages, <https://www.ibm.com/cloud/watson-assistant/>.

IBM, "IBM Watson Products and Services", printed on Dec. 6, 2018, 3 pages, <https://www.ibm.com/watson/products-services/>.

IBM, "Natural Language Classifier", Watson Natural Language Classifier, printed on Dec. 6, 2018, 9 pages, <https://www.ibm.com/watson/services/natural-language-classifier.html>.

Lunden, Ingrid, "With Smart Reply, Google's Inbox Can Now Respond to Emails for You Automatically", 3 years ago, techcrunch/Nov. 3, 2015, printed on Dec. 6, 2018, 2 pages, <https://techcrunch.com/2015/11/03/with-smart-reply-googles-inbox--can-now-respond-to-emails-for-you-automatically/>.

Metz et al., "Soon, Gmail's AI Could Reply to Your Email for You", Wired, 2015, 8 pages, <https://www.wired.com/2015/11/google-is-using-ai-to-create-automatic-replies-in-gmail/.

* cited by examiner

COGNITIVE MESSAGE RESPONSE ASSISTANT

BACKGROUND OF THE INVENTION

The present invention relates generally to the field of electronic messaging, and more particularly to a cognitive message response assistant.

Instant messaging (IM) is a set of communication technologies used for text-based communication between two or more participants over the Internet or other types of networks. IM chat happens in real-time. Online chat and instant messaging differ from other technologies such as email due to the perceived quasi-synchrony of the communications by the users. Some systems permit messages to be sent to users not then "logged on" (offline messages), thus removing some differences between IM and email (often done by sending the message to the associated email account). IM allows effective and efficient communication, allowing immediate receipt of acknowledgment or reply.

Currently, many industries are trending toward cognitive models enabled by big data platforms and machine learning models. Cognitive models, also referred to as cognitive entities, are designed to remember the past, interact with humans, continuously learn, and continuously refine responses for the future with increasing levels of prediction.

SUMMARY

Embodiments of the present invention disclose a method, a computer program product, and a system for cognitive message response. The method may include one or more computer processors receiving an electronic message from a message initiator. The one or more computer processors create a custom knowledge base associated with a recipient of the electronic message. The one or more computer processors determine whether the recipient is available to respond to the received electronic message. Responsive to determining the recipient is not available to respond to the received electronic message, the one or more computer processors determine a status of the recipient based on the custom knowledge base and one or more types of unstructured data. The one or more computer processors determine a status of the message initiator. Based, at least in part, on the received electronic message, the one or more computer processors determine a content of the message. Based, at least in part, on the status of the recipient, the status of the initiator, and the content of the electronic message, the one or more computer processors predict a response of the recipient to the received electronic message. The one or more computer processors create a response to the received electronic message based on the predicted response. The one or more computer processors transmit the response to the message initiator.

DETAILED DESCRIPTION

Instant messaging is an efficient method to get electronic communication responses in real time. However, when the recipient of a message is away, a known method of reply is for the recipient to provide pre-defined responses. Existing instant messaging applications, as are known in the art, have the ability to send a static or pre-defined set of messages to reply to a message initiator when the recipient is unavailable. Some applications may use pre-defined images or icons to represent whether a recipient is in a meeting or away from the computer or device. Embodiments of the present invention recognize that efficiency may be gained by providing a cognitive message response application which acts as a "personal assistant," using cognitive analysis to sense, predict, or infer the status of a message recipient, and then driving machine-to-human dialogues in response to an instant message based on the determined status, rather than relying on static rules that pre-determine a response based on a known status of the recipient. Embodiments of the present invention also recognize that creating a custom knowledge base while continuously gathering and analyzing dynamic data associated with a message recipient enables the personal assistant to craft a customized response to a received message and respond more quickly to the received message. Implementation of embodiments of the invention may take a variety of forms, and exemplary implementation details are discussed subsequently with reference to the Figures.

As referred to herein, all data retrieved, collected, and used, with regards to a recipient and an initiator, is used in an opt in manner, i.e., the recipient and the initiator have given permission for the data to be used. Any data or information used for which the recipient and the initiator have not opted in is data that is publicly available.

Figure 1:
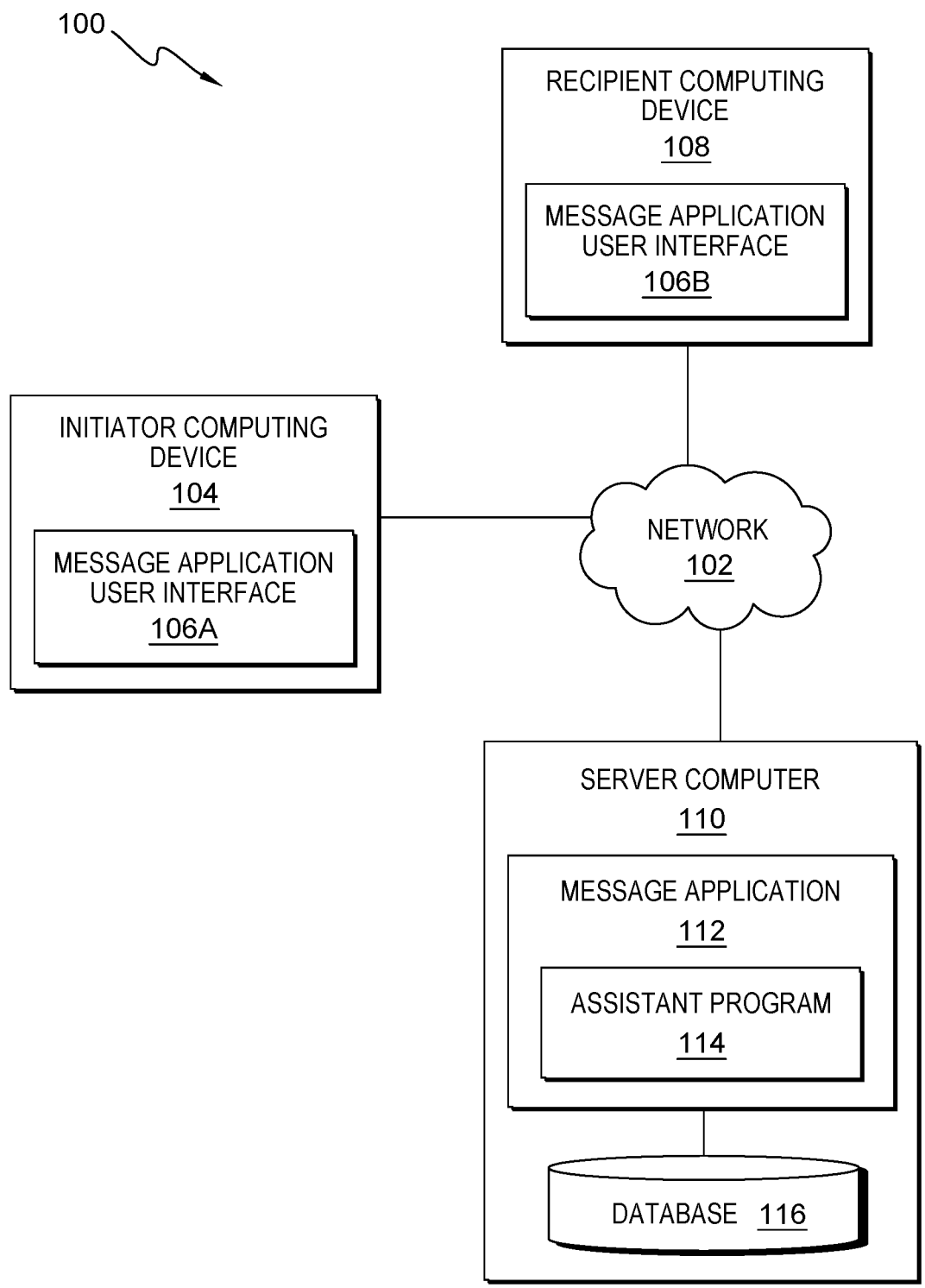
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes initiator computing device 104, recipient computing device 108, and server computer 110, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between initiator computing device 104, recipient computing device 108, and server computer 110, and other computing devices (not shown) within distributed data processing environment 100.

Initiator computing device 104 and recipient computing device 108 can each be a laptop computer, a tablet computer, a smart phone, or any programmable electronic device capable of communicating with various components and devices within distributed data processing environment 100, via network 102. Initiator computing device 104 and recipient computing device 108 may each be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment where the head mounted display enables augmented reality, a user may be able to interact with message application user interface 106A and application user interface 106B via overlaid virtual graphics viewed in the head mounted display. In general, initiator computing device 104 and recipient computing device 108 each represents one or more programmable electronic devices or combination of programmable electronic devices capable of executing machine readable program instructions and communicating with other computing devices (not shown) within distributed data processing environment 100 via a network, such as network 102. Initiator computing device 104 and recipient computing device 108 each represents one or more devices associated with a user. Initiator computing device 104 and recipient computing device 108 each includes an instance of message application user interface 106, i.e., message application user interface 106A and message application user interface 106B, respectively.

Message application user interface 106A and message application user interface 106B each provide an interface between a user of initiator computing device 104 or a user of recipient computing device 108, respectively, and server computer 110. Herein, message application user interface 106A and message application user interface 106B are referred to collectively as message application user interface 106. In one embodiment, message application user interface 106 may be graphical user interfaces (GUI) or web user interfaces (WUI) and can display text, documents, web browser windows, user options, application interfaces, and instructions for operation, and include the information (such as graphic, text, and sound) that a program presents to a user and the control sequences the user employs to control the program. In another embodiment, message application user interface 106 may also be mobile application software that provides an interface between a user of initiator computing device 104 and server computer 110 or a user of recipient computing device 108 and server computer 110. Mobile application software, or an "app," is a computer program designed to run on smart phones, tablet computers and other mobile devices.

Server computer 110 can be a standalone computing device, a management server, a web server, a mobile computing device, or any other electronic device or computing system capable of receiving, sending, and processing data. In other embodiments, server computer 110 can represent a server computing system utilizing multiple computers as a server system, such as in a cloud computing environment. In another embodiment, server computer 110 can be a laptop computer, a tablet computer, a netbook computer, a personal computer (PC), a desktop computer, a personal digital assistant (PDA), a smart phone, or any programmable electronic device capable of communicating with initiator computing device 104, recipient computing device 108, and other computing devices (not shown) within distributed data processing environment 100 via network 102. In another embodiment, server computer 110 represents a computing system utilizing clustered computers and components (e.g., database server computers, application server computers, etc.) that act as a single pool of seamless resources when accessed within distributed data processing environment 100. Server computer 110 includes message application 112 and database 116. Server computer 110 may include internal and external hardware components, as depicted and described in further detail with respect to FIG. 3.

Message application 112 is one of a plurality of software programs in the art that enable a user to send messages to a second user of message application 112, via message application user interface 106. Message application 112 may be web based or a software application which utilizes application programming interfaces (APIs) to enable communications between users. In one embodiment, message application 112 is a text message application, such as a short message service (SMS) application. In the depicted embodiment, message application 112 resides on server computer 110. In another embodiment, message application 112 resides on initiator computing device 104 and recipient computing device 108. In a further embodiment, message application 112 may reside elsewhere within distributed data processing environment 100 provided that initiator computing device 104 and recipient computing device 108 have access to message application 112. Message application 112 includes assistant program 114.

Assistant program 114 is an automated personal assistant, or "chat bot," that can converse with the initiator of an instant message using cognitive data-driven solutions, when the intended recipient of the instant message is not available to respond. Assistant program 114 includes a prediction module (not shown) which predicts based on gathered data about the nature of the activity of the recipient and uses this information in composing a response. Thus, the initiator receives a dynamic, cognitive reply instead of a pre-defined, static response. In the depicted embodiment, assistant program 114 is integrated within message application 112. In another embodiment, assistant program 114 can be a stand-alone program provided that message application 112 can access assistant program 114. In the depicted embodiment, assistant program 114 resides on server computer 110. In another embodiment, assistant program 114 may reside on initiator computing device 104 or recipient computing device 108. In a further embodiment, assistant program 114 may reside elsewhere within data processing environment 100 provided assistant program 114 has access to message application 112 and database 116. On receiving an instant message, assistant program 114 determines whether the recipient is available to respond to the message. If assistant program 114 determines that the recipient is not available to respond to the message, then assistant program 114 determines the status of the recipient using a plurality of available, unstructured data, including, but not limited to, data in the format of text, images, audio, and video information. Assistant program 114 determines the initiator status, which may include, but is not limited to, the initiator's location and relationship with the recipient. Assistant program 114 determines content included in the initiator's message. If assistant program 114 determines that the recipient has granted permission to share details of the recipient's whereabouts and schedule, then assistant program 114 creates a detailed response to the initiator's message. If assistant program 114 determines that the recipient has not granted permission to share details of the recipient's whereabouts and schedule, then assistant program 114 creates a restricted response to the initiator's message. In either scenario, after creating a response, assistant program 114 transmits the response to the initiator. The "conversation" between assistant program 114 and the initiator continues until the initiator ends the dialogue. Assistant program 114 is depicted and described in further detail with respect to FIG. 2.

Database 116 is a repository for data used by assistant program 114. In the depicted embodiment, database 116 resides on server computer 110. In another embodiment, database 116 may reside on initiator computing device 104, recipient computing device 108, or elsewhere within distributed data processing environment 100 provided assistant program 114 have access to database 116. A database is an organized collection of data. Database 116 can be implemented with any type of storage device capable of storing data and configuration files that can be accessed and utilized by assistant program 114, such as a database server, a hard disk drive, or a flash memory. Database 116 stores data used by assistant program 114 to determine a status of a recipient of an instant message. For example, database 116 may store user-initiated configurations for one or more contacts of the user of recipient computing device 108, which may include, but are not limited to, name, phone number, street address, email address, relationship to the recipient, and an associated level of permission or a security policy regarding shared information. In addition, database 116 may store configurations for users that opt in to using assistant program 114 which allows assistant program 114 to retrieve pertinent data. Database 116 may also store social media user profiles for the users of initiator computing device 104 and recipient computing device 108, which include, but are not limited to, lists of contacts, user likes and dislikes, images saved or posted by the user, etc. Database 116 may also store electronic calendar entries for users. Database 116 may also store the results of any cognitive analyses performed by assistant program 114.

Figure 2:
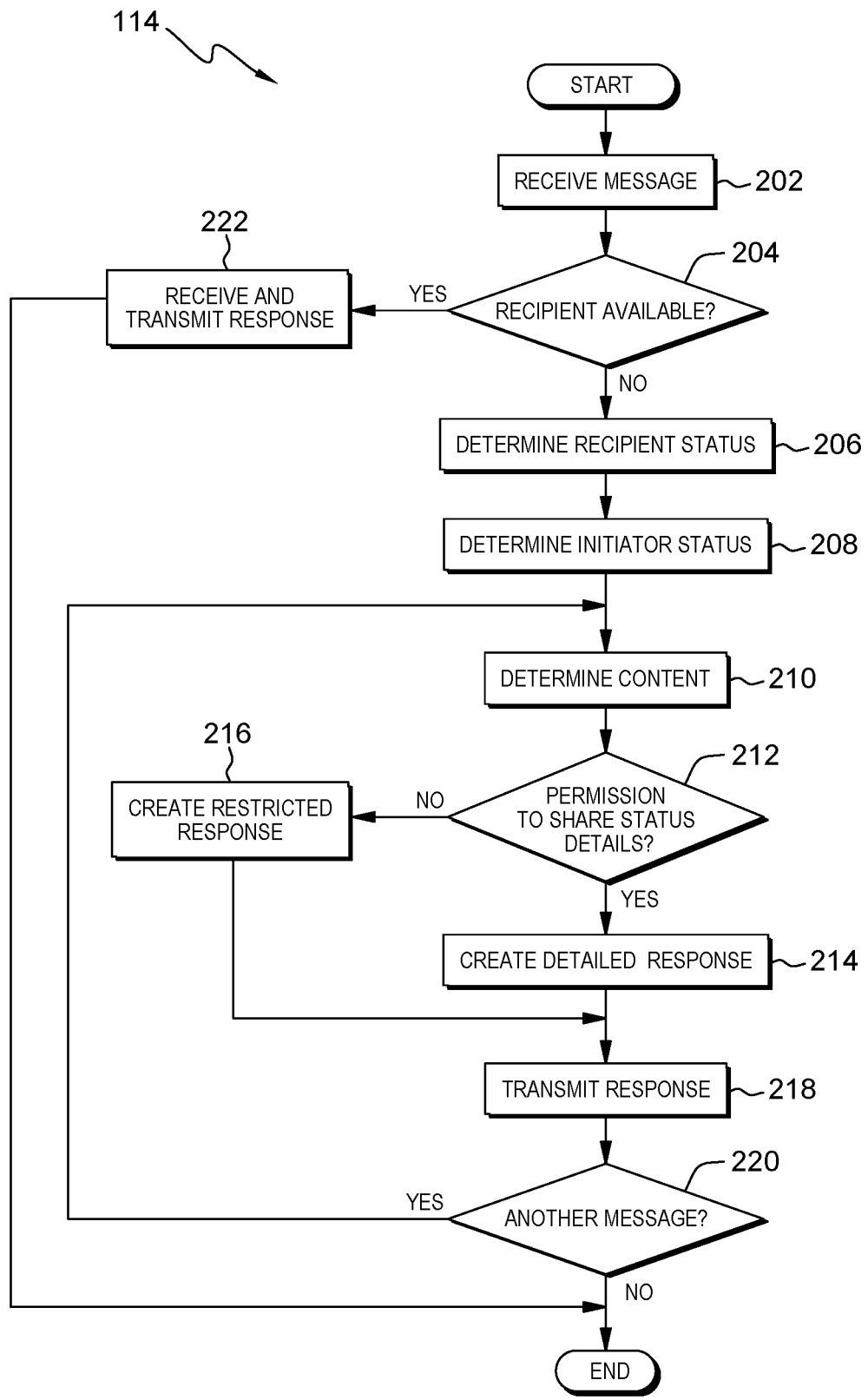
FIG. 2 is a flowchart depicting operational steps of an assistant program, on a server computer within the distributed data processing environment of FIG. 1, for dynamically determining a response to a message, in accordance with an embodiment of the present invention.

FIG. 2 is a flowchart depicting operational steps of assistant program 114, on server computer 110 within distributed data processing environment 100 of FIG. 1, for dynamically determining a response to a message, in accordance with an embodiment of the present invention.

Assistant program 114 receives a message (step 202). When the user of initiator computing device 104, i.e., the initiator, sends a message, via message application user interface 106, to the user of recipient computing device 108, i.e., the recipient, assistant program 114 receives the message.

Assistant program 114 determines whether the recipient is available to respond to the received message (decision block 204). Assistant program 114 determines whether the recipient is active online, using recipient computing device 108. In one embodiment, assistant program 114 determines whether the recipient is available by determining whether a pre-defined threshold of time has passed since the last action on recipient computing device 108. In another embodiment, assistant program 114 determines the location of recipient computing device 108, via one or more of a plurality of techniques known in the art, to determine whether the recipient is available. For example, assistant program 114 may utilize a global positioning system (GPS), or other location services, in recipient computing device 108 (not shown) to determine that the recipient is driving a car or in a doctor's office, and therefore is unavailable to respond to an instant message.

If the recipient is available to respond to the message ("yes" branch, decision block 204), then assistant program 114 receives and transmits the response (step 222). In one embodiment, assistant program 114 receives a response, as composed by the recipient, and transmits the response via message application 112. In another embodiment, assistant program 114 receives the response via message application user interface 106 on recipient computing device 108 and transmits the response directly to message application user interface 106 on initiator computing device 104. In one embodiment, assistant program 114 may determine the recipient is available to respond to the received message, and monitor whether the recipient responds to the message within a pre-defined threshold of time. In the embodiment, if the recipient does not respond to the message within the pre-defined threshold of time, then assistant program 114 determines the recipient is not available. In the embodiment, the pre-defined threshold of time may depend on the status of the recipient or on the recipient's relationship with the initiator. The recipient may store one or more pre-defined thresholds of time in database 116 as a user-initiated configuration.

If the recipient is not available to respond to the message ("no" branch, decision block 204), then assistant program 114 determines recipient status (step 206). As used herein, status refers to details about the recipient which assistant program 114 can use to determine why the recipient is unavailable to respond to the message from the initiator, to predict when the recipient might be available to respond, or to predict how the recipient would respond to the message if the recipient was available, and thereby give assistant program 114 sufficient information to respond to the message. In order to respond to the message, assistant program 114 utilizes a plurality of sources of unstructured data in order to determine a status of the recipient. Data sources include, but are not limited to, a history of user actions, social media information, bank transactions, email, previous instant messaging conversations, calendar entries, locations determined by GPS or other location service, images, audio clips, video clips, and metadata of images, audio clips and video clips, which may be stored either on recipient computing device 108 or in database 116. In one embodiment, data sources may include one or more biometric sensors associated with the recipient. Data sources may also include any publicly available information, such as from a publicly available website or database, or any private information to which the recipient has granted access. In some embodiments, access to the data may depend on variables such as recipient status, initiator status, initiator identification, etc. For example, historical social media communications can provide access to information such as dates and locations where the recipient has checked in. In addition, assistant program 114 can use a social media profile and social media communications to determine family or personal relationships with other users, such as the initiator. Assistant program 114 can also analyze social media data to determine whether the recipient is tagged with friends or family, for example, in a photo that indicates a current or recent location. Additionally, assistant program 114 can determine whether the recipient plans to attend an event advertised on social media. In another example, assistant program 114 can use previous emails or instant message communications to determine the recipient's different communication styles and frequency of communication with certain individuals. In addition, assistant program 114 can use the previous communications to determine the recipient's plans for a certain date or time. In a further example, assistant program 114 can use credit card purchase information for insight into when and where the recipient makes purchases, and whether the purchases are, for example, in a grocery store or a restaurant. In yet another example, assistant program 114 can use the recipient's calendar entries to determine the recipient's plans, meetings, or appointments. In a further example, assistant program 114 can analyze images or videos, and metadata associated with the images or videos, stored either on recipient computing device 108 or database 116, to determine locations of activities the recipient has participated in and with whom the recipient spends time and tags the images with keywords associated with the locations or people in the images. In an embodiment where assistant program 114 can retrieve data from one or more biometric sensors associated with the recipient, assistant program 114 may retrieve the recipient's heartrate or blood pressure to determine whether the recipient is in a stressful situation. In one embodiment, assistant program 114 can also analyze structured data. For example, assistant program 114 can retrieve data such as the recipient's name, a domain name, or a login ID.

Thus, by analyzing the available unstructured data, and in some embodiments, structured data, assistant program 114 can determine the status of the recipient. In one embodiment, assistant program 114 uses cognitive artificial intelligence (AI) to perform machine learning for analysis of the available unstructured, and in some embodiments, structured, data and determination of the recipient's status. Machine learning explores the study and construction of algorithms that can learn from and make predictions on data. Such algorithms operate by building a model from example inputs in order to make data-driven predictions or decisions expressed as outputs, rather than following strictly static program instructions. Within the field of data analytics, machine learning is a method used to devise complex models and algorithms that lend themselves to prediction. These analytical models allow researchers, data scientists, engineers, and analysts to produce reliable, repeatable decisions and results and to uncover hidden insights through learning from historical relationships and trends in the data. The cognitive AI system continuously learns about the recipient as it builds a custom knowledge base for the recipient, adding information to database 116 as the information is available and analyzed. As the knowledge base grows, the ability of assistant program 114 to respond quickly and accurately to a received message increases. In one embodiment, the cognitive AI system employs one or more neural networks to accomplish machine learning. For example, if assistant program 114 determines the recipient has just arrived at a grocery store, and receives a message asking "When will you be home?" then assistant program can analyze historical data to determine how long the recipient stayed in the grocery store on previous visits. Assistant program 114 can also analyze the traffic patterns for the recipient's usual route from the grocery store to the recipient's home. Further, assistant program 114 can review the recipient's calendar or social media posts to determine whether the recipient is planning to go directly home after the grocery store, or if the recipient has another appointment to attend first. By combining data from the various sources, assistant program 114 predicts a response to the message.

In one embodiment, assistant program 114 assigns a confidence level associated with data retrieved from various data sources. Assistant program 114 may assign higher confidence levels to primary data than to secondary data. For example, assistant program 114 may assign a high confidence level to data from a bank transaction which includes metadata defining a location and a timestamp of the transaction, because this information is available in real time. In another example, assistant program 114 may assign a low confidence level to a social media post by an associate of the recipient which mentions a recently attended event for which the date and time of the event cannot be confidently established. In one embodiment, assistant program 114 requires the assigned confidence level to exceed a predefined threshold in order to be considered in the analysis of the recipient's status.

In one embodiment, assistant program 114 assigns weights to the various data points in order to improve the accuracy of a prediction, e.g., to pinpoint an activity in which the recipient is involved at a particular time. In an embodiment, the weights may be based on historical data. For example, assistant program 114 may have learned that the recipient only attends 50% of the events for which the recipient has expressed an interest in on social media, while the recipient attends 90% of the items on the recipient's calendar. Therefore, in the previous example, assistant program 114 assigns a greater probability of the recipient attending an appointment on the calendar versus an event posted on social media. In another embodiment, the weights may be based on a previously determined confidence level. For example, assistant program 114 may assign a larger weight to data retrieved with a 90% confidence level than to data retrieved with a 60% confidence level. Assistant program 114 combines the data, based on the relative weights, to determine the status of the recipient. In a further embodiment, assistant program 114 only assigns weights to data points that exceed a predefined confidence level.

Assistant program 114 determines the initiator status (step 208). Assistant program 114 determines the status of the initiator in order to determine an appropriate response to the message. The status of the initiator may include, but is not limited to, the identity of the initiator, the location of the initiator, the relationship between the initiator and the recipient, if any, and historical emails, text messages, or instant message communications between the initiator and the recipient. Assistant program 114 retrieves and analyzes unstructured data from a plurality of data sources, as described with respect to the recipient status, in order to determine the status of the initiator. For example, in an embodiment where assistant program 114 can retrieve data from one or more biometric sensors associated with the initiator, assistant program 114 may retrieve the initiator's heartrate or blood pressure to determine whether the initiator is in a stressful situation. In some embodiments, assistant program 114 retrieves and analyzes structured data in addition to the unstructured data to determine the status of the initiator. In one embodiment, the initiator opts in to assistant program 114, via message application user interface 106, in order to allow assistant program 114 to retrieve pertinent data.

Assistant program 114 determines a content of the electronic message (step 210). In an embodiment, assistant program 114 analyzes the received message using one of a plurality of cognitive AI services to parse the message and gather entities or keywords in the message in order to determine, i.e., understand, the content or meaning of the message from the initiator. In one embodiment, assistant program 114 determines whether the content of the message includes a request. For example, if the received message was "Good morning. I need to talk to you," then assistant program 114 determines the request is for whether the recipient is available to chat with the initiator. In another example, if the received message is "What are you doing for lunch?" then assistant program 114 determines the initiator wants to know if the recipient has plans for a time or location where the recipient will be eating lunch. In an embodiment, assistant program 114 determines the tone or urgency of the message using one of a plurality of natural language processing (NLP) techniques. In another embodiment, assistant program 114 infers the urgency of the message based on the location of the initiator. For example, assistant program 114 determines, via one or more location services, that the initiator is located in an emergency room, and receives a message from the initiator such as "Are you downtown?" Based on knowledge that the initiator is not a medical professional and any message from a non-medical professional residing in a hospital has high importance, assistant program 114 can determine that since the initiator is in an emergency room, the message is urgent, and the initiator needs a quick, informative response.

Assistant program 114 determines whether the recipient has provided permission to share status details with the initiator (decision block 212). In an embodiment, the recipient can configure assistant program 114 to set a security policy, providing permissions for the amount of information shared with an initiator. A recipient may want to limit information shared with strangers or acquaintances and allow assistant program 114 to share more detailed information with close friends or family. For example, if a coworker contacts the recipient after work hours, or on the weekend, then the recipient may want assistant program 114 to provide a restricted response, i.e., with a limited amount of details. However, if a friend or family member contacts the recipient after work hours, the recipient may want assistant program 114 to provide a more detailed response regarding the recipient's whereabouts, future schedule, etc. In one embodiment, the recipient configures assistant program 114 to look up the initiator's identity in the recipient's contacts list, stored in database 116, where the recipient has designated whether permission is given to share status details. In one embodiment, permission is binary, i.e., either yes or no. In another embodiment, assistant program 114 may allow for a plurality of levels of permission, where the levels indicate the amount or type of details that can be shared or a time frame in which details can be shared. For example, if levels are assigned numbers from 0 to 10, 10 being the highest level of permission, a stranger, i.e., an initiator with no entry in the recipient's contact list, may be level 0 while a spouse is level 10, and a coworker is level 5. In one embodiment, assistant program 114 determines the level of permission based on the status of the initiator, previously determined in step 208. For example, if the initiator is a stranger, but sends a message from an emergency room with a tone of urgency, then assistant program 114 determines a higher level of detail to share, than if the stranger sends an even-toned message from an office building 100 miles away from the recipient. In one embodiment, the recipient can configure assistant program 114 with one or more permission overrides. For example, the recipient can set a blanket permission for certain initiators. In another embodiment, assistant program 114 can modify permissions based on past interactions with the initiator. For example, assistant program 114 can, with machine learning, determine that an initiator may start out as just a co-worker, but the relationship with the recipient changes with time into a friendship, as learned from the types of discussions between the recipient and the initiator, as well as the time and locations of the discussions.

If assistant program 114 determines the recipient has provided permission to share status details with the initiator ("yes" branch, decision block 212), then assistant program 114 creates a detailed response (step 214). Based on the recipient status, the initiator status, the determined request, and a level of permission which allows sharing of the recipient's status details, assistant program 114 dynamically predicts how the recipient would respond and creates a detailed response to the message. In an embodiment, assistant program 114 uses the keywords parsed from the initiator's message to search through the gathered unstructured data associated with the recipient's status to find information relevant to composing a response. For example, assistant program 114 receives a message from an initiator saying "What time can we meet?" Then assistant program 114 extracts the terms "what time" and "meet," as discussed with respect to step 210, and determines the content of the message. Assistant program 114 then retrieves recent credit card data used at a restaurant, and determines the time of the transaction, the place of the transaction for identification of the restaurant (i.e., whether it is a fast food restaurant or a sit-down restaurant), and the location of the transaction, for determination of the travel time from the restaurant back to the recipient's home or office, and, using the prediction module, predicts when the recipient will be available for a meeting. In an example of using the initiator's status for composition of the response, if the message is "Hello. Where are you? I'd like to chat about getting together later," and the initiator is a close friend or family member, then assistant program 114 can create a response such as "<recipient name> just went to the grocery store. Try again in an hour." In another example, if the initiator is a coworker, with a lower level of permission than a family member, then a response to the same message may be "<recipient name>'s calendar is booked solid for today. <recipient name> has time to chat at 9:00 tomorrow morning. Would you like me to schedule a meeting at that time?"

If assistant program 114 determines whether the recipient has not provided permission to share status details with the initiator ("no" branch, decision block 212), then assistant program 114 creates a restricted response (step 216). Based on the recipient status, the initiator status, the determined request, and a level of permission which does not allow sharing of the recipient's status details, assistant program 114 predicts how the recipient would respond and creates a restricted response to the message. For example, if the message is "You've won a 4-night trip to the Bahamas!" and the initiator is not in the recipient's contact list, then assistant program 114 can create a generic response such as "<recipient name> is not available at this time."

Responsive to creating either a detailed response or a restricted response, assistant program 114 transmits the response (step 218). After creating a response to the message, assistant program 114 transmits the response to message application user interface 106 on initiator computing device 104. In one embodiment, assistant program 114 transmits the response via message application 112.

Assistant program 114 determines whether another message is received (decision block 220). If assistant program 114 receives another message from the initiator ("yes" branch, decision block 220), then assistant program 114 returns to step 210 to determine the content of the new message. In an embodiment where assistant program 114 uses one of a plurality of intelligent conversation services, assistant program 114 persists in a conversational manner with the initiator, responding to messages based on the appropriate permission level, until the initiator ends the conversation. For example, if the first message is "Will you be home in a half hour?" then assistant program 114 may determine the response is "Yes." If the next message is "Great! Do you want to get some dinner?" then assistant program 114 creates another response, based on the gathered data, with more details, as allowed by the permission level, such as "I can't. I'm having dinner with Joe."

If assistant program 114 does not receive another message from the initiator ("no" branch, decision block 220), then assistant program 114 ends execution.

Figure 3:
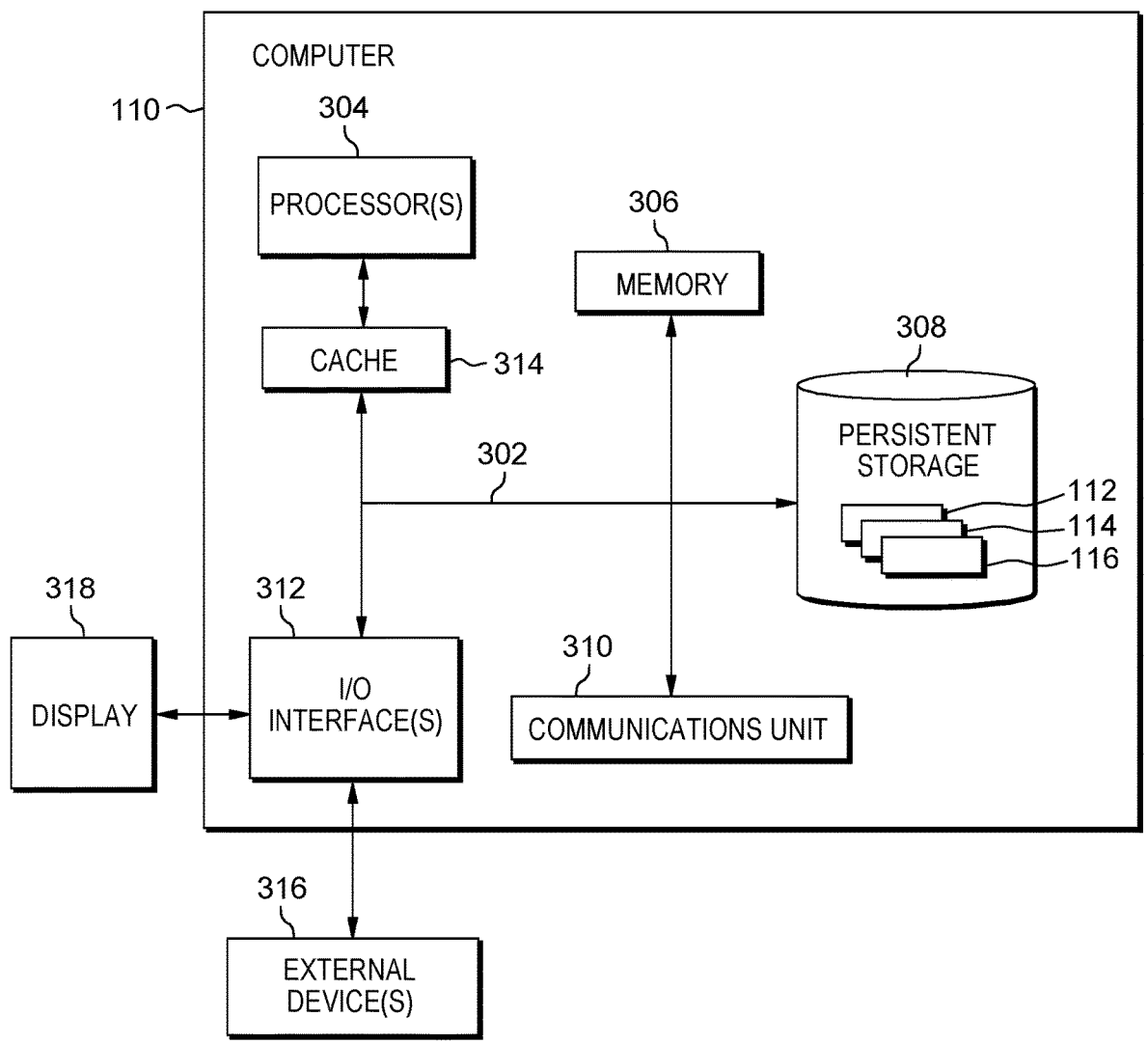
FIG. 3 depicts a block diagram of components of the server computer executing the assistant program within the distributed data processing environment of FIG. 1, in accordance with an embodiment of the present invention.

FIG. 3 depicts a block diagram of components of server computer 110 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Server computer 110 can include processor(s) 304, cache 314, memory 306, persistent storage 308, communications unit 310, input/output (I/O) interface(s) 312 and communications fabric 302. Communications fabric 302 provides communications between cache 314, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM). In general, memory 306 can include any suitable volatile or non-volatile computer readable storage media. Cache 314 is a fast memory that enhances the performance of processor(s) 304 by holding recently accessed data, and data near recently accessed data, from memory 306.

Program instructions and data used to practice embodiments of the present invention, e.g., message application 112, assistant program 114 and database 116, are stored in persistent storage 308 for execution and/or access by one or more of the respective processor(s) 304 of server computer 110 via cache 314. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of initiator computing device 104 and recipient computing device 108. In these examples, communications unit 310 includes one or more network interface cards. Communications unit 310 may provide communications through the use of either or both physical and wireless communications links. Message application 112, assistant program 114, database 116, and other programs and data used for implementation of the present invention, may be downloaded to persistent storage 308 of server computer 110 through communications unit 310.

I/O interface(s) 312 allows for input and output of data with other devices that may be connected to server computer 110. For example, I/O interface(s) 312 may provide a connection to external device(s) 316 such as a keyboard, a keypad, a touch screen, a microphone, a digital camera, and/or some other suitable input device. External device(s) 316 can also include portable computer readable storage media such as, for example, thumb drives, portable optical or magnetic disks, and memory cards. Software and data used to practice embodiments of the present invention, e.g., assistant program 114 and database 116 on server computer 110, can be stored on such portable computer readable storage media and can be loaded onto persistent storage 308 via I/O interface(s) 312. I/O interface(s) 312 also connect to a display 318.

Display 318 provides a mechanism to display data to a user and may be, for example, a computer monitor. Display 318 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for cognitive message response, the method comprising:

receiving, by one or more computer processors, an electronic message from a message initiator;

creating, by the one or more computer processors, a custom knowledge base associated with a recipient of the electronic message;

determining, by the one or more computer processors, whether the recipient is available to respond to the received electronic message;

responsive to determining the recipient is not available to respond to the received electronic message, determining, by the one or more computer processors, a status of the recipient based on the custom knowledge base associated with the recipient and one or more types of unstructured data;

determining, by the one or more computer processors, a status of the message initiator;

based, at least in part, on the received electronic message, determining, by the one or more computer processors, a content of the electronic message;

based, at least in part, on the status of the recipient, the status of the message initiator, and the content of the electronic message, predicting, by the one or more computer processors, a response of the recipient to the received electronic message;

creating, by the one or more computer processors, a response to the received electronic message based on the predicted response; and transmitting, by the one or more computer processors, the response to the message initiator.

2. The method of claim 1, further comprising:

determining, by the one or more computer processors, whether the recipient granted permission to share one or more details of the status of the recipient with the message initiator and responsive to determining the recipient granted permission to share one or more details of the status of the recipient with the message initiator, including, by the one or more computer processors, one or more details in the response to the received electronic message.

3. The method of claim 2, wherein determining whether the recipient granted permission to share one or more details of the status of the recipient with the message initiator comprises determining, by the one or more computer processors, one or more levels of permission, wherein the one or more levels include an indication selected from the group of: an amount of details that can be shared, a type of detail that can be shared, and a time frame in which a detail can be shared.

4. The method of claim 1, further comprising:

determining, by the one or more computer processors, whether the recipient granted permission to share one or more details of the status of the recipient with the message initiator; and responsive to determining the recipient did not grant permission to share one or more details of the status of the recipient with the message initiator, restricting, by the one or more computer processors, one or more details to be included in the response to the received electronic message.

5. The method of claim 1, wherein determining the status of the recipient comprises:

retrieving, by the one or more computer processors, one or more types of unstructured data;

determining, by the one or more computer processors, one or more confidence levels associated with the one or more types of unstructured data;

determining, by the one or more computer processors, whether the one or more confidence levels exceed a pre-defined threshold;

responsive to determining the one or more confidence levels exceed the pre-defined threshold, assigning, by the one or more computer processors, a weight to data associated with each of the one or more confidence levels; and combining, by the one or more computer processors, the weighted data to determine the status of the recipient.

6. The method of claim 1, wherein determining the status of the message initiator comprises retrieving, by the one or more computer processors, data selected from the group consisting of: an identity of the message initiator, a location of the message initiator, a relationship between the message initiator and the recipient, a historical email communication between the message initiator and the recipient, a historical text message communication between the message initiator and the recipient, a historical instant message communication between the message initiator and the recipient, data from a biometric sensor associated with the message initiator, and any publicly available information.

7. The method of claim 1, wherein determining the content of the message initiator further comprises analyzing, by the one or more computer processors, the received electronic message using one or more cognitive artificial intelligence services.

8. The method of claim 1, further comprising determining, by the one or more computer processors, a status of the recipient using one or more types of structured data, wherein the one or more types of structured data are selected from the group consisting of a name of the recipient, a name of the initiator, a domain name, or a login ID.

9. The method of claim 1, wherein the one or more types of unstructured data are in a format selected from the group consisting of: text, an image, audio information, and video information.

10. The method of claim 1, wherein a source of the one or more types of unstructured data is selected from the group consisting of: a history of one or more user actions, social media information, a bank transaction, an email, a previous instant messaging conversation, a calendar entry, a global positioning system (GPS) location, another location service location, an image, an audio clip, a video clip, a biometric sensor associated with the recipient, metadata of an image, metadata of an audio clip, metadata of a video clip, and any publicly available information.

11. The method of claim 1, wherein predicting a response of the recipient to the received electronic message comprises:

parsing, by the one or more computer processors, the received electronic message;

gathering, by the one or more computer processors, one or more keywords parsed from the received electronic message;

based, at least in part, on the gathered one or more keywords, determining, by the one or more computer processors, the content of the message;

searching, by the one or more computer processors, through the unstructured data associated with the status of the recipient for information relevant to the content of the message;

based, at least in part, on the content of the message and the unstructured data associated with the status of the recipient, determining, by the one or more computer processors, information relevant to composing a response; and predicting, by one or more computer processors, a response of the recipient based, at least in part, on the determined information relevant to compose a response.

12. The method of claim 1, further comprising:

determining, by the one or more computer processors, whether an additional electronic message is received from the message initiator;

based on the additional electronic message, creating, by the one or more computer processors, an additional response to the additional electronic message; and transmitting, by the one or more computer processors, the additional response to the message initiator.

13. A computer program product for cognitive message response, the computer program product comprising:

one or more computer readable storage devices and program instructions stored on the one or more computer readable storage devices, the stored program instructions comprising:

program instructions to receive an electronic message from a message initiator;

program instructions to create a custom knowledge base associated with a recipient of the electronic message;

program instructions to determine whether the recipient is available to respond to the received electronic message;

responsive to determining the recipient is not available to respond to the received electronic message, program instructions to determine a status of the recipient based on the custom knowledge base associated with the recipient and one or more types of unstructured data;

program instructions to determine a status of the message initiator;

based, at least in part, on the received electronic message, program instructions to determine a content of the electronic message;

based, at least in part, on the status of the recipient, the status of the message initiator, and the content of the electronic message, program instructions to predict a response of the recipient to the received electronic message;

program instructions to create a response to the received electronic message based on the predicted response; and program instructions to transmit the response to the message initiator.

14. The computer program product of claim 13, wherein the program instructions to determine the status of the recipient comprise:

program instructions to retrieve one or more types of unstructured data;

program instructions to determine one or more confidence levels associated with the one or more types of unstructured data;

program instructions to determine whether the one or more confidence levels exceed a pre-defined threshold;

responsive to determining the one or more confidence levels exceed the pre-defined threshold, program instructions to assign a weight to data associated with each of the one or more confidence levels; and program instructions to combine the weighted data to determine the status of the recipient.

15. The computer program product of claim 13, wherein the stored program instructions to determine the status of the message initiator comprise program instructions to retrieve data selected from the group consisting of: an identity of the message initiator, a location of the message initiator, a relationship between the message initiator and the recipient, a historical email communication between the message initiator and the recipient, a historical text message communication between the message initiator and the recipient, a historical instant message communication between the message initiator and the recipient, data from a biometric sensor associated with the message initiator, and any publicly available information.

16. The computer program product of claim 13, wherein the program instructions to predict a response of the recipient to the received electronic message comprise:

program instructions to parse the received electronic message;

program instructions to gather one or more keywords parsed from the received electronic message;

based, at least in part, on the gathered one or more keywords, program instructions to determine the content of the message;

program instructions to search through the unstructured data associated with the status of the recipient for information relevant to the content of the message;

based, at least in part, on the content of the message and the unstructured data associated with the status of the recipient, program instructions to determine information relevant to composing a response; and program instructions to predict a response of the recipient based, at least in part, on the determined information relevant to compose a response.

17. A computer system for cognitive message response, the computer system comprising:

one or more computer processors;

one or more computer readable storage devices;

program instructions stored on the one or more computer readable storage devices for execution by at least one of the one or more computer processors, the stored program instructions comprising:

program instructions to receive an electronic message from a message initiator;

program instructions to create a custom knowledge base associated with a recipient of the electronic message;

program instructions to determine whether the recipient is available to respond to the received electronic message;

responsive to determining the recipient is not available to respond to the received electronic message, program instructions to determine a status of the recipient based on the custom knowledge base associated with the recipient and one or more types of unstructured data;

program instructions to determine a status of the message initiator;

based, at least in part, on the received electronic message, program instructions to determine a content of the electronic message;

based, at least in part, on the status of the recipient, the status of the message initiator, and the content of the electronic message, program instructions to predict a response of the recipient to the received electronic message;

program instructions to create a response to the received electronic message based on the predicted response; and program instructions to transmit the response to the message initiator.

18. The computer system of claim 17, wherein the program instructions to determine the status of the recipient comprise:

program instructions to retrieve one or more types of unstructured data;

program instructions to determine one or more confidence levels associated with the one or more types of unstructured data;

program instructions to determine whether the one or more confidence levels exceed a pre-defined threshold;

responsive to determining the one or more confidence levels exceed the pre-defined threshold, program instructions to assign a weight to data associated with each of the one or more confidence levels; and program instructions to combine the weighted data to determine the status of the recipient.

19. The computer system of claim 17, wherein the stored program instructions to determine the status of the message initiator comprise program instructions to retrieve data selected from the group consisting of: an identity of the message initiator, a location of the message initiator, a relationship between the message initiator and the recipient, a historical email communication between the message initiator and the recipient, a historical text message communication between the message initiator and the recipient, a historical instant message communication between the message initiator and the recipient, data from a biometric sensor associated with the message initiator, and any publicly available information.

20. The computer system of claim 17, wherein the program instructions to predict a response of the recipient to the received electronic message comprise:
program instructions to parse the received electronic message;
program instructions to gather one or more keywords parsed from the received electronic message;
based, at least in part, on the gathered one or more keywords, program instructions to determine the content of the message;
program instructions to search through the unstructured data associated with the status of the recipient for information relevant to the content of the message;
based, at least in part, on the content of the message and the unstructured data associated with the status of the recipient, program instructions to determine information relevant to composing a response; and
program instructions to predict a response of the recipient based, at least in part, on the determined information relevant to compose a response.

* * * * *